United States Patent
Villasante Marcos et al.

(10) Patent No.: US 12,156,118 B2
(45) Date of Patent: Nov. 26, 2024

(54) METHODS AND APPARATUS FOR DATA TRAFFIC ROUTING

(71) Applicant: Telefonaktiebolaget LM Ericsson (publ), Stockholm (SE)

(72) Inventors: Carlota Villasante Marcos, Madrid (ES); Marc Molla, Madrid (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 457 days.

(21) Appl. No.: 17/612,050

(22) PCT Filed: Apr. 28, 2020

(86) PCT No.: PCT/EP2020/061697
§ 371 (c)(1),
(2) Date: Nov. 17, 2021

(87) PCT Pub. No.: WO2020/249299
PCT Pub. Date: Dec. 17, 2020

(65) Prior Publication Data
US 2022/0240157 A1    Jul. 28, 2022

(30) Foreign Application Priority Data
Jun. 11, 2019 (EP) .................................. 19382485

(51) Int. Cl.
*H04L 41/16* (2022.01)
*G06N 3/02* (2006.01)
(Continued)

(52) U.S. Cl.
CPC .......... *H04W 40/248* (2013.01); *G06N 3/02* (2013.01); *H04L 41/16* (2013.01); *H04W 40/12* (2013.01); *H04W 84/18* (2013.01)

(58) Field of Classification Search
CPC .......... G06N 3/02; H04L 41/16; H04W 40/12
See application file for complete search history.

(56) References Cited

U.S. PATENT DOCUMENTS

2019/0123974 A1   4/2019  Georgios et al.
2021/0092640 A1*  3/2021  Ravishankar ....... H04L 47/6275

FOREIGN PATENT DOCUMENTS

EP    2843875 A1    3/2015
EP    3416336 A1    12/2018

OTHER PUBLICATIONS

"Hybrid Access Broadband Network Architecture", Broadband Forum, TR-348, Issue 1; https://www.broadband-forum.org/download/TR-348.pdf, Jul. 2016, pp. 1-49.

* cited by examiner

Primary Examiner — Dang T Ton
(74) Attorney, Agent, or Firm — Weisberg I.P. Law, P.A.

(57) ABSTRACT

A data traffic routing method and apparatus for controlling data traffic in a communication network, the method comprising: receiving, at a first agent from a User Plane Function, communication network status information; calculating, by the first agent, data traffic routing instructions using a current routing model; sending by the first agent: the data traffic routing instructions to the User Plane Function; and experience information to a second agent; storing, at the second agent, the experience information; determining, at the second agent, if the number of instances of stored experience information exceeds a predetermined threshold; and if it is determined that the number of instances of stored experience information exceeds a predetermined threshold: training a neural network using the instances of stored experience information; and updating the current routing model using results of the neural network training.

21 Claims, 6 Drawing Sheets

(51) Int. Cl.
*H04W 40/12* (2009.01)
*H04W 40/24* (2009.01)
*H04W 84/18* (2009.01)

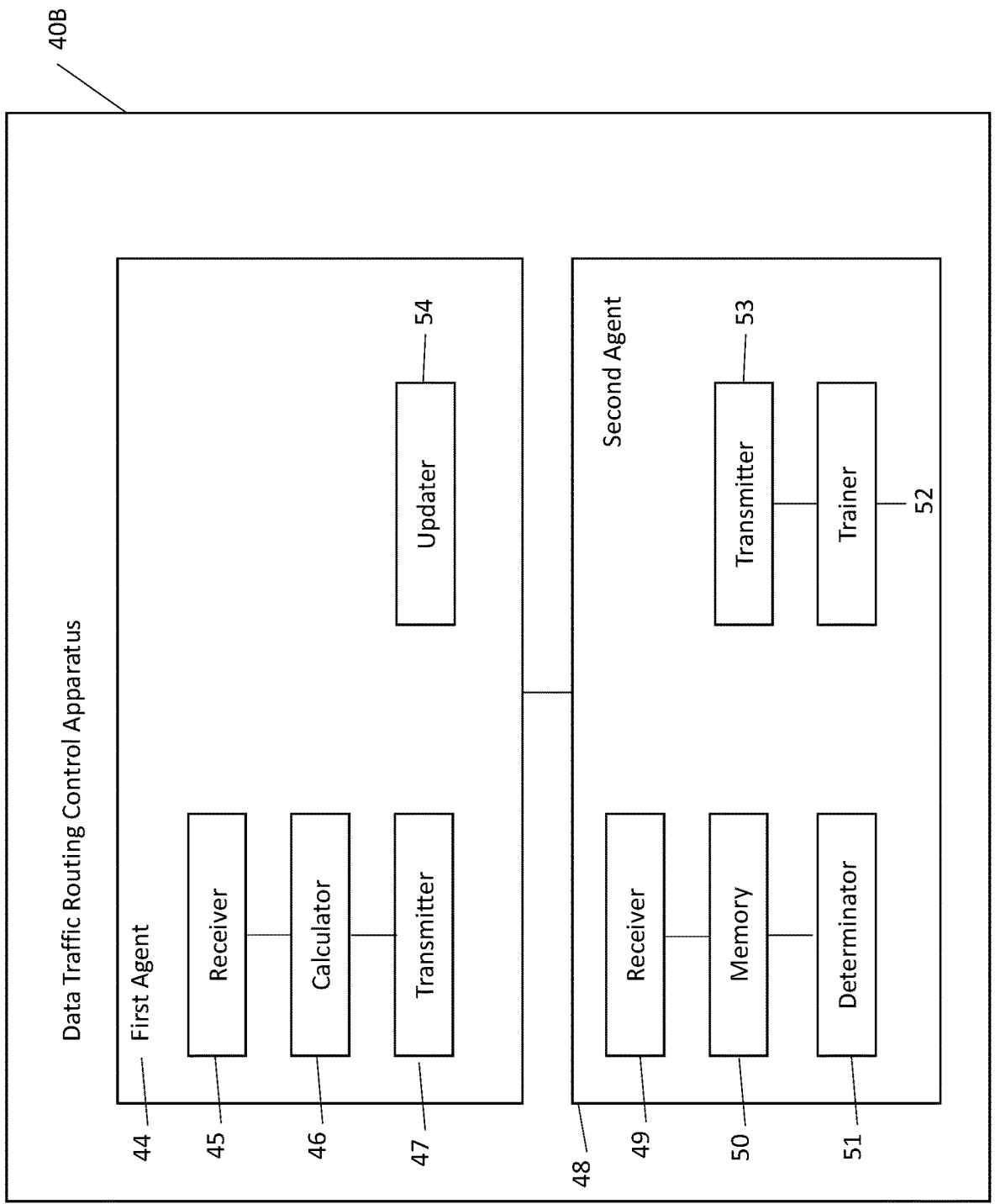

METHODS AND APPARATUS FOR DATA TRAFFIC ROUTING

TECHNICAL FIELD

Embodiments of the present disclosure relate to methods and apparatus for data traffic routing, and in particular methods and apparatus for controlling data traffic in communication networks.

BACKGROUND

Communication networks have historically been designed and controlled with the aim of maximising performance criteria. As such, the primary aims for a network may be related to maximising available bandwidth, minimising lag time or latency, minimising signal loss or retransmissions, and so on. In addition to considering the above aims with reference to the network as a whole, the aims can also be considered from the perspective of individual data packets. As networks increase in complexity, maximising performance criteria on a per data packet basis may become increasingly challenging.

One of the key concepts of the new $3^{rd}$ Generation Partnership Project (3GPP) $5^{th}$ Generation (5G) architecture is the consolidation of the Access Networks (AN). The 5G System Architecture defines a converged core network (CN) with a common interface AN-CN. The common interface may be used to integrate 3GPP networks (such as 5G networks, or earlier generation networks) and non-3GPP networks (such as Wi-Fi or fixed access networks). The integration of networks forms a multi-access architecture, which may allow new data transmission scenarios where several access networks may be used at the same time.

With a multi-access architecture, it is possible to define new use cases that may be classified depending of the use of the plural access networks. Examples of use cases include: i) aggregation use cases, which aggregate the access networks in a way that the end-user perceives only one access with the aggregated characteristics of the underlying accesses (aggregated bandwidth, latency, etc.); and ii) resilience use case, which uses only one access network at the time and retains the rest of the access networks in reserve, to provide redundancy. Examples of resilience use cases include digital assistants operated using mobile telephones, which may use by default Wi-Fi access networks when available, but may also open a session through mobile access network for backup purposes.

"Hybrid Access Broadband Network Architecture" by "Broadband Forum", TR-348, Iss. 1, July 2016, available at https://www.broadband-forum.org/download/TR-348.pdf as of 29 May 2019 contains a consideration of multi-access architectures including fixed and wireless networks, and addresses topics such as increased access reliability and higher throughput.

Where network data traffic is distributed across plural paths (either through a single network or through plural networks), the data traffic may be distributed across the different paths according to a combination of factors, which may include network provider policies, packet traffic class and the performance of each available access path. Where network provider policies and traffic class are to be taken into account, this is typically straightforward, and may be achieved by implementing a configuration that is generic or associated with an end user. However, determining the performance of an access path to select the best path for sending a data packet may be more complex.

Existing systems for selecting a path based on performance typically rely on packet scheduling algorithms. Multi-path transmission control protocols (MPTCP) may use the smoothed Round-Trip Time (SRTT) and the Congestion Window as parameters for characterizing the performance of an access path. The SRTT is the time taken for a signal to be sent from a source to a destination and for an acknowledgement to be sent from the destination to the source (the round trip time or RTT), averaged over a number of readings to provide a "smoothed" estimate. The congestion window is essentially a limit on the number of bytes that can await transmission via a given connection at any one time; if the congestion window for a connection is full it would be necessary to select an alternative connection for which the congestion window is not full. In an example implementation, the kernel implementation of the MPTCP may select, when scheduling a data packet, the path with lowest SRTT, if the congestion window for that path is not full.

It is theoretically possible, if a perfect knowledge of the network parameters could be obtained, to build a packet scheduler that provides optimal performance. However, in practice, the latency of network accesses varies over time, especially in mobile networks, and the bandwidth also varies depending on the number of concurrent connections. TCP congestion control and RTT classic estimators (based on Jacobson/Karels algorithm) are typically not sophisticated enough to take into account such variations, particularly for situations in which multi-access architectures may be implemented. It is therefore desirable to provide improved data traffic routing control which may more accurately model network configurations to take into account variations in latency and bandwidth availability, thereby allowing more efficient routing of data traffic.

Complex problems, such as data traffic routing through networks, may be modelled using neural networks. Machine learning algorithms, such as those used in neural networks, operate by building a model based on inputs and using that to make predictions or decisions, rather than following only explicitly programmed instructions. Complex situations may be addressed using deep neural networks, that is, neural networks having multiple layers (hidden layers) of neurons between the input and output layers. Deep Reinforcement Learning (DRL) is a concept which employs elements of reinforcement learning, in which a machine learning algorithm learns by attempting to maximise a reward for a series of actions utilising trial-and-error, and Deep Learning using deep neural networks. An example of a reinforcement learning technique which may be used in conjunction with a deep neural network is Q-Learning (Quality Learning). Q-Learning is based on finding the policy that maximize a cumulative reward obtained in successive steps, starting from an initial state. Although Deep Reinforcement Learning may be particularly suitable for modelling data traffic routing through networks, other machine learning techniques may additionally or alternatively be used, such as stochastic optimisation based techniques.

FIG. 1 is a conceptual diagram of a known deep learning architecture. In the architecture shown in FIG. 1, the deep neural network 101 transmits data to, and receives data from, the environment 103 which it is being used to model/control. For a time t, the deep neural network receives information on a current state of the environment $s_t$. The deep neural network then processes the information $s_t$, and generates an action to be taken $a_t$. This action is then transmitted back to the environment and put into effect. The result of the action is a change in the state of the environment with time, so at time t+1 the state of environment is $s_{t+1}$. The action also results in a (numerical) reward $r_{t+1}$, which is a measure of effect of the action $a_t$. The changed state of the environment $s_{t+1}$ is then transmitted from the environment to the deep neural network, along with the reward $r_{t+1}$. FIG. 1 shows reward $r_t$ being sent to the neural network together with state $s_t$; reward $r_t$ is the reward resulting from action $a_{t-1}$, performed on state $s_{t-1}$. When the deep neural network receives state information $s_{t+1}$ this information is then processed in conjunction with reward $r_{t+1}$ in order to determine the next action $a_{t+1}$, and so on. The actions are selected by the neural network from a number of available actions with the aim of maximising the cumulative reward. In the context of a data traffic routing system, the state of the environment may be the current configuration of the network (congestion levels, available connections, data to be sent, available access networks where plural networks are present, and so on). The action may be a determination of a path a data packet should take through the network (which may be a consolidated network), and the reward may be a measure of the effect of the passage of a packet through the network, which may take into account the effect on the specific packet (such as RTT) and also on the network as a whole (cumulative throughput, latency, packet loss, etc.). Higher reward values may represent more positive effects (such as lower RTT, higher throughput, etc.).

Although DRL may be used to accurately model data traffic routing through networks, the technique is inherently unsuitable for direct implementation in packet routing. DRL is typically suitable for solving problems that: can be modelled and simulated for the training of the neural network, and that support response times in the order of centiseconds. By contrast, for typical data traffic management systems, there is not a good model for simulating the real network environment so the real network environment response must therefore be studied. Also, packet scheduling is a task that must be done in microseconds in order to avoid unacceptable delays in data transmission. Therefore an existing DRL system would be difficult to train with accurate data, and would provide a response too slow for use in data traffic management.

SUMMARY

It is an object of the present disclosure to facilitate data traffic control in a communication network, such that the data traffic may be routed more efficiently.

Embodiments of the disclosure aim to provide methods and data traffic routing control apparatuses that alleviate some or all of the problems identified.

An aspect of the disclosure provides a data traffic routing method for controlling data traffic in a communication network, the method comprising: receiving, at a first agent from a User Plane Function, communication network status information; calculating, by the first agent, data traffic routing instructions using a current routing model; sending by the first agent: the data traffic routing instructions to the User Plane Function; and experience information to a second agent; storing, at the second agent, the experience information; determining, at the second agent, if the number of instances of stored experience information exceeds a predetermined threshold; and if it is determined that the number of instances of stored experience information exceeds a predetermined threshold: training a neural network using the instances of stored experience information; and updating the current routing model using results of the neural network training. In this way, accurate routing instructions for data traffic may be promptly provided.

The communication network may comprise a consolidated network formed from a plurality of networks, the plurality of networks comprising a wireless network and a further network. Aspects of embodiment may be of particular use in providing routing instructions for complex and changeable networks, such as those resulting from consolidation of plural access networks.

The second agent may send the update information for updating the current routing model to the first agent, the first agent and the User Plane Function may be located in a first network device, and the second agent and the neural network may be located in a second network device. Locating the first agent with the UPF may help avoid transmission delays between the first agent and the UPF, while locating the second agent and the neural network in a further device may allow custom hardware to be used to support the neural network.

Weights and biases of the current routing model may be updated using the result of the neural network training, thereby maintaining the accuracy of the current routing model and of the routing instructions provided using the routing model.

The experience information may comprises at least one of: the state of the communication network prior to implementation of the data traffic routing instructions; the data traffic routing instructions; the state of the communication network following the implementation of the data traffic routing instructions; and the packet routing performance of the communication network following the implementation of the data traffic routing instructions. Using some or all of the above values the neural network may be trained to maintain an accurate model of the communication network, thereby allowing the neural network to be used to provide efficient and accurate routing instructions (via the routing model).

A further aspect of the disclosure provides a data traffic routing control apparatus for controlling data traffic in a communication network, the apparatus comprising processing circuitry and a non-transitory machine-readable medium storing instructions, the apparatus being configured to: receive, using a first agent, from a User Plane Function, communication network status information; calculate, using the first agent, data traffic routing instructions using a current routing model; send, using the first agent, the data traffic routing instructions to the User Plane Function; and send, using the first agent, experience information; receive and store, using a second agent, the experience information; and determine, using the second agent, if the number of instances of stored experience information exceeds a predetermined threshold; wherein, if the second agent determines that the number of instances of stored experience information exceeds a predetermined threshold, the apparatus is further configured to: train a neural network using the instances of stored experience information; and send update information, using the second agent to the first agent, for updating the current routing model using results of the neural network training. In this way, accurate routing instructions for data traffic may be promptly provided.

Further aspects provide apparatuses and computer-readable media comprising instructions for performing the methods set out above, which may provide equivalent benefits to those set out above. The scope of the invention is defined by the claims.

BRIEF DESCRIPTION OF DRAWINGS

For a better understanding of the present disclosure, and to show how it may be put into effect, reference will now be made, by way of example only, to the accompanying drawings, in which:

FIG. 4B is a schematic diagram of a further example of a data traffic routing control apparatus;

DETAILED DESCRIPTION

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
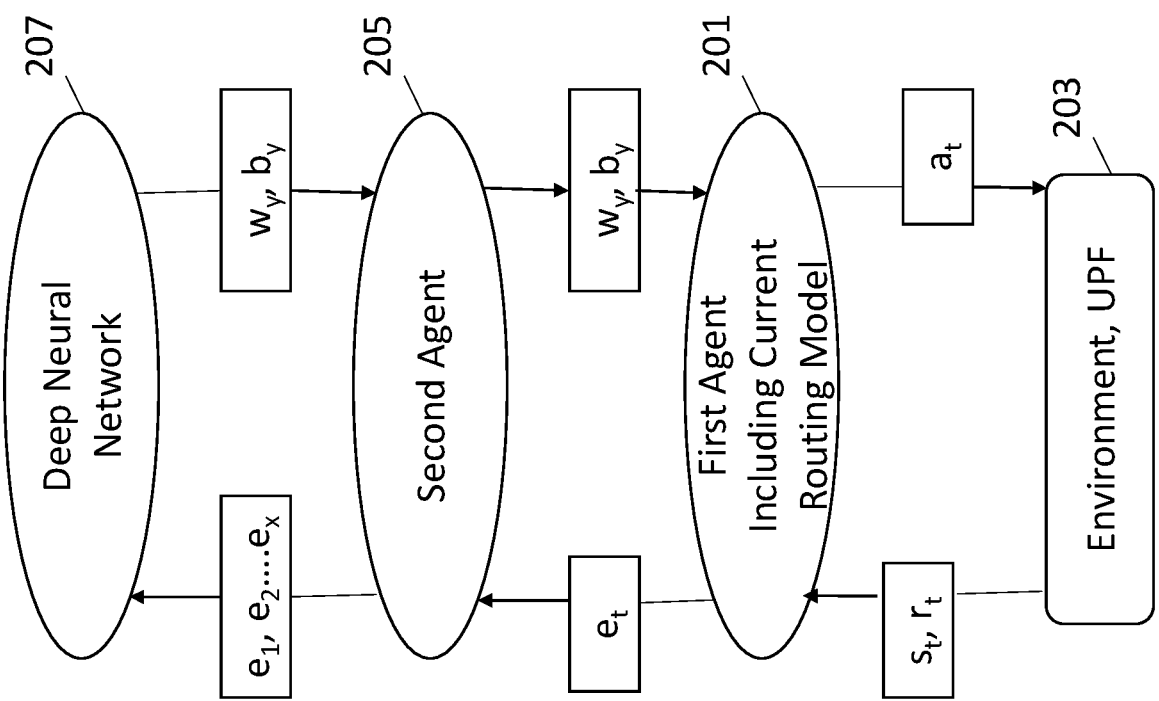
FIG. 2 is a conceptual diagram of a data traffic routing control configuration in accordance with an aspect of an embodiment.
Figure 3A:
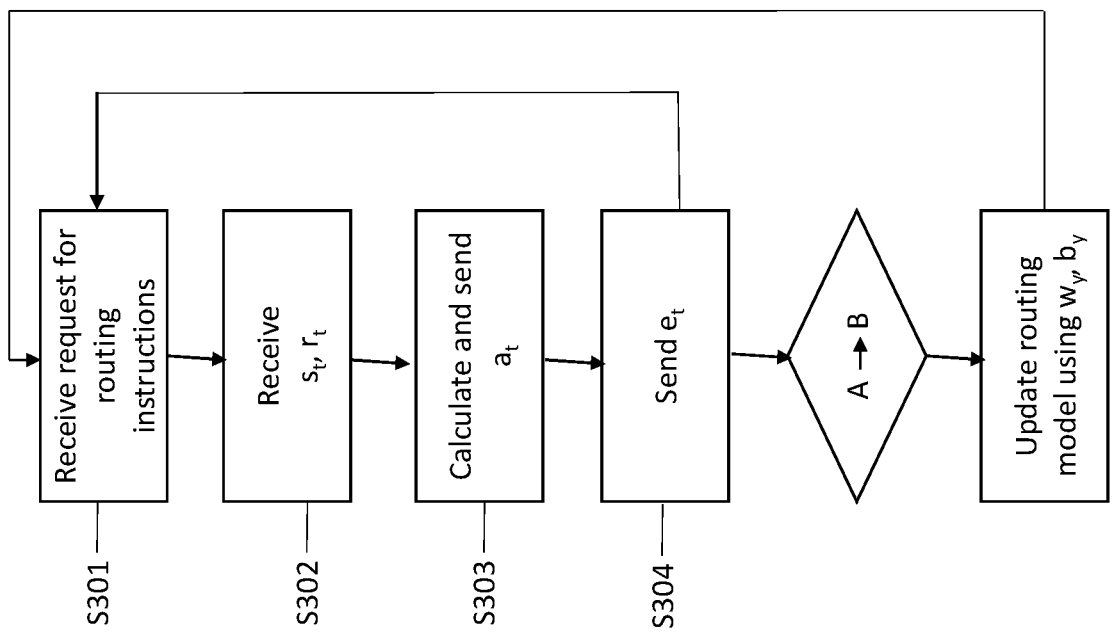
FIG. 3A is a flowchart of a method performed by a first agent in accordance with an aspect of an embodiment.
Figure 3B:
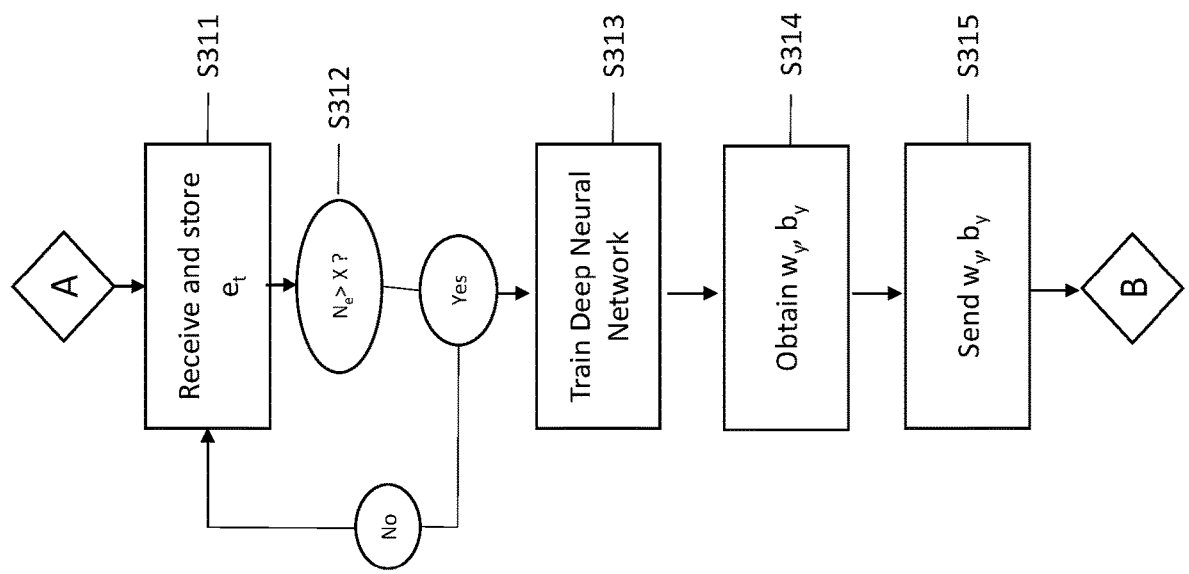
FIG. 3B is a flowchart of a method performed by a second agent in accordance with an aspect of an embodiment
Figure 4A:
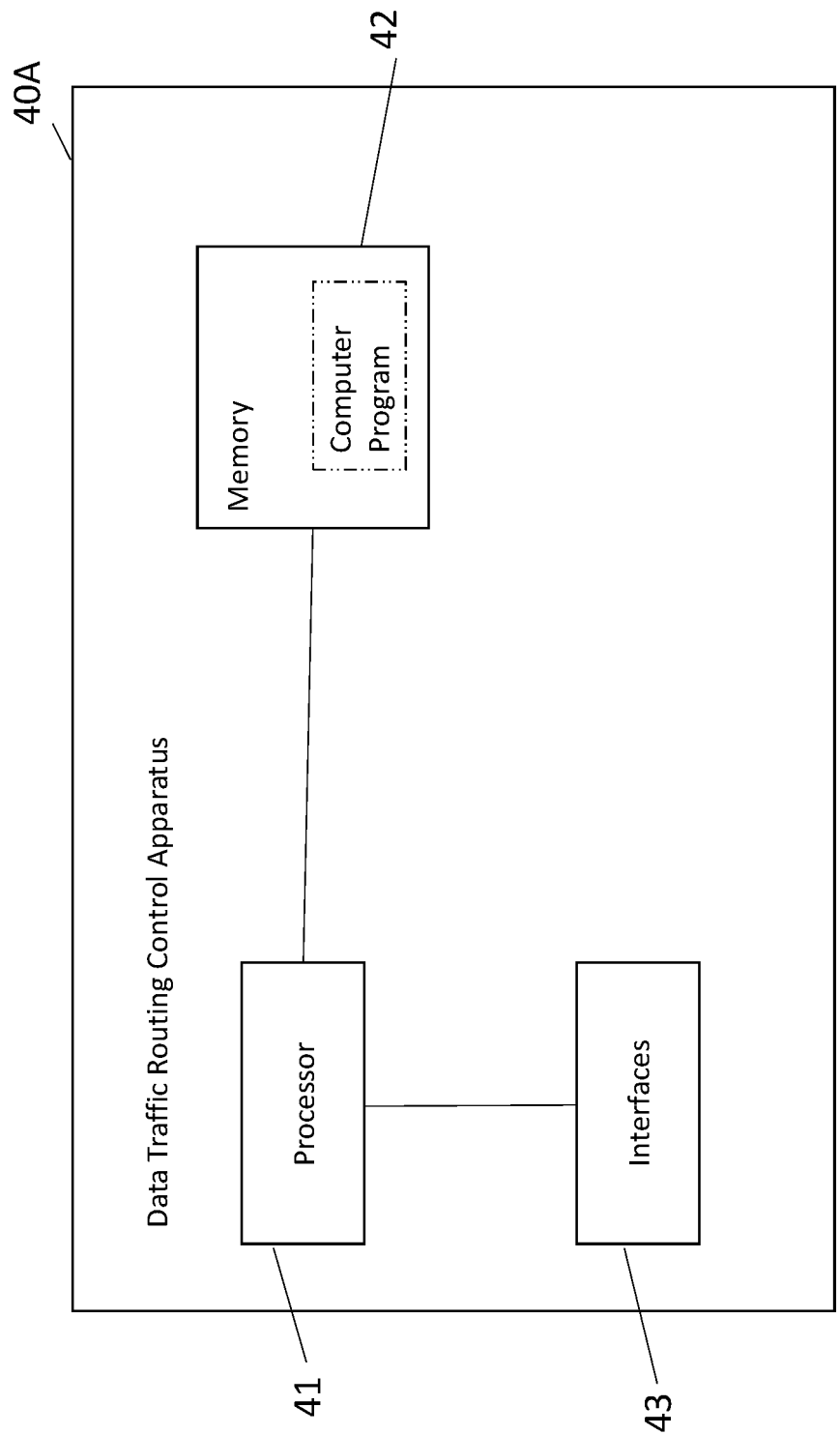
FIG. 4A is a schematic diagram of an example of a data traffic routing control apparatus.

FIG. 2 is a conceptual diagram of a data traffic routing control configuration in accordance with aspects of embodiments of the present disclosure. Flowcharts of methods in accordance with aspects of embodiments of the present disclosure are shown in FIG. 3A and FIG. 3B. The methods may be performed by any suitable apparatus, for example, the data traffic routing control apparatus shown schematically in FIG. 4A and the data traffic routing control apparatus shown schematically in FIG. 4B.

In the embodiment illustrated conceptually by FIG. 2, the system of the present disclosure comprises two agents, which may be referred to as twin agents. The first agent 201 occupies the position of the neural network of the conceptual diagram of FIG. 1; the first agent may receive communication network status information; which may include a current state of the environment ($s_t$) and the reward ($r_t$) resulting from a previous action ($a_{t-1}$). The first agent may then generate an action to be taken ($a_t$), that is, the first agent may generate data traffic routing instructions. The first agent may also be referred to as an on-wire agent; this agent is directly responsible for real time routing decisions. The agents may be software modules operating on existing hardware, specific hardware modules (such as controller modules), a combination of software and hardware, and so on. For simplicity, FIG. 2 shows the UPF combined with the environment 203; this is because the focus of the diagram is the arrangement of the agents. The state of the environment may be the current configuration of the network (congestion levels, available connections, data to be sent, available access networks where plural networks are present, and so on). The action may be a determination of a path a data packet should take through the network (which may be a consolidated network), and the reward may be a measure of the effect of the passage of a packet through the network, which may take into account the effect on the specific packet (such as RTT) and also on the network as a whole (cumulative throughput, latency, packet loss, etc.). Higher reward values may represent more positive effects (such as lower RTT, higher throughput, etc.).

Figure 1:
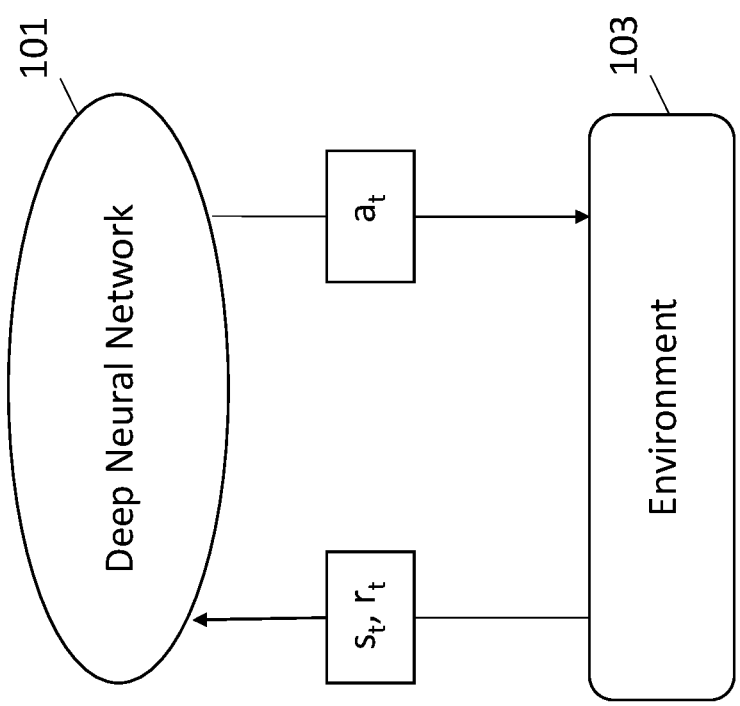
FIG. 1 is a conceptual diagram of a known deep learning architecture.

Contrary to the known configuration shown conceptually in FIG. 1, the first agent does not comprise a machine learning system such as a deep neural network. Instead, the first agent comprises or is connected to a current routing model, which is a cached static model of a neural network. The term "static" in the context of the current routing model means that the current routing model is not constantly changing as a result of learning from new information (as may be the case with a machine learning system such as a deep neural network). The cached routing model is not itself a neural network or other machine learning system, but is instead modified based on results from machine learning systems as discussed below.

In the embodiment shown in FIG. 2, the first agent is connected to a second agent 205. The second agent is not responsible of real time routing decisions, and may also be referred to as an off-wire agent. The second agent may be connected to or comprise a neural network; typically a deep neural network is used in order to simulate the complexity of a network environment, but a standard neural network not comprising a large number of hidden layers, or another machine intelligence system, may be suitable for some network environments. In the embodiment shown in FIG. 2, the second agent is connected to a deep neural network 207. The machine intelligence (such as a deep neural network) may be trained using information relating to the environment, actions, and so on that is passed to the second agent by the first agent, and the results of the neural network training may then be used to update the current routing model. An example of how this process may function in an aspect of an embodiment is discussed in greater detail below with reference to the flowcharts in FIG. 3. The methods illustrated in the FIG. 3 flowcharts may be performed by any suitable apparatus, for example, the data traffic routing control apparatus shown schematically in FIG. 4A and the data traffic routing control apparatus shown schematically in FIG. 4B.

FIG. 3A shows the method performed by the first (on-wire) agent. The first agent receives a request for routing instructions for one or more data packets (that is, data traffic) in step S301. The request for routing instructions may be received from a User Plane Function (UPF); the UPF may be responsible for routing the data traffic through the communication network. In some embodiments, the first agent may be contained within the same physical apparatus (such as a base station) as the UPF; this can reduce delays in the routing of packages that would otherwise be caused by sending requests to, and receiving instructions from, a first agent located remotely from the UPF. In other aspects of embodiments, particularly where the first agent uses specialised hardware, the first agent may be located separately from the UPF. The request for routing instructions may be received by the processor 41 of the apparatus 40A shown in FIG. 4A, executing instructions stored in the memory 42, or may be received by the receiver 45 of the first agent 44 of the apparatus 40B shown in FIG. 4B.

The request for routing instructions may be encompassed within or accompanied by communication network status information from the UPF, or the communication network status information may be obtained separately from the request for routing instructions (see step S302). The communication network status information may also include information such as the current state of the network and/or rewards resulting from previous actions. The current state of the network may comprise what connections are active between nodes, congestion levels, data to be transmitted, and so on. Further information such as the reliability of connections may also be included, which may be of particular relevance in consolidated networks where the respective reliabilities of component networks may vary significantly. Information of the availability of backup networks may also be provided, where applicable. Consolidated networks may be particularly complex and difficult to efficiently route data traffic through, and therefore particularly suitable for use with aspects of embodiments. The consolidated networks may comprise one or more wireless networks (which may use the same or different technologies, such as 5G, 4G, Bluetooth™, and so on), and may additionally or alternatively comprise further networks such as WiFi networks, fixed access networks, and so on. The communication network may alternatively be a non-consolidated network, such as a wireless network, a WiFi network, fixed access network, and so on.

The requests for routing instructions and/or communication network status information may be received by the first agent each time N data packets have been received for routing at the UPF (where N is a positive integer). In a limit scenario N=1, so routing and/or communication network status information may be sent to the first agent for each data packet. Alternatively, N may be set to a higher value, such that routing instructions are obtained for batches of several data packets. In some aspects of embodiments the requests may be sent with a higher frequency than the communication network status information. As a further alternative, the requests and/or communication network status information may be sent periodically, for any data packets accumulated at the UPF during the period.

When communication network status information and a request for routing instructions have been received by the first agent, the first agent may then use some or all of this information to calculate data traffic routing instructions for the data packet or packets, which may then be sent to the UPF (see step S303). The data traffic routing instructions may relate specifically to the data traffic (that is, the data packet or packets) in a request for routing instructions, or may be more broadly applicable instructions such as instructions to be followed for routing for a predetermined period of time or until further notice. The data traffic routing instructions may be calculated using the current routing model; as discussed above the current routing model may be a static model based on a DNN, or may be another form of model derived from the results of training a machine intelligence. The data traffic routing instructions may be calculated by the processor 41 of the apparatus 40A shown in FIG. 4A, executing instructions stored in the memory 42, and transmitted using the interfaces 43, or may be calculated by the calculator 46 and transmitted by the transmitter 47 of the first agent 44 of the apparatus 40B shown in FIG. 4B.

In addition to calculating the data traffic routing instructions and sending the instructions to the UPF, the first agent may also be configured to send information to the second, off-wire, agent (as shown in step S304). The second agent may be located in the same physical apparatus as the first agent and/or the UPF, which can help to reduce delays in transmissions between the first and second agents. In some aspects of embodiments, the second agent may be located in a different physical apparatus to the first agent (and/or UPF). A core network node, which may comprise one or more servers, may comprise the second agent, and may additionally or alternatively comprise the machine intelligence. As machine intelligences such as deep neural networks can require substantial computing resources (such as processor time and storage capacity) to operate, it may be efficient for the second agent and machine intelligence to be conveniently located where suitable computing resources are available such as in a core network node, while the first agent and UPF may be located in a base station to minimise delays in communications between the UPF and first agent. The information may be handled by the processor 41 of the apparatus 40A shown in FIG. 4A, executing instructions stored in the memory 42, or may be sent by the transmitter 47 and received by the receiver 49 of the second agent 48 and stored in the memory 50 of the apparatus 40B shown in FIG. 4B.

The information sent to the second agent by the first agent may be experience information $e_t$, relating to a specific time t. Where experience information $e_t$ is sent, each instance of experience information may comprise one or more of: the state of the communication network prior to implementation of the data traffic routing instructions $s_t$, the data traffic routing instructions $a_t$, the state of the communication network following the implementation of the data traffic routing instructions $s_{t+1}$ and the packet routing performance of the communication network following the implementation of the data traffic routing instructions $r_{t+1}$. The experience information $e_t$ may be transmitted to the second agent by the first agent each time routing instructions are provided by the first agent, or instances of experience information (for example, $e_t, e_{t+1}, \ldots e_{t+n}$) may be stored at the first agent and sent in batches to the second agent. In aspects of embodiments, the experience information may be sent as a finite ordered list of elements, or tuple.

FIG. 3B shows the method performed by the second (off-wire) agent. In aspects of embodiments the second agent may store the experience information received from the first agent (see step S311). The second agent may include storage for storing the experience information, or the second agent may be linked to storage for storing the experience information. The storage used by the second agent may be referred to as a replay memory, as the experience information stored in the storage may be used by a machine intelligence linked to the second agent to replay previous routing decisions made by the current routing model.

The second agent may be configured, either periodically or when experience information is received from the first agent, to determine if the number of instances of stored experience $N_e$ exceeds a predetermined threshold, X (see step S312). The predetermined threshold X is an integer value (a count of instances of stored experience) that may be set taking into consideration the specific requirements of the communication network and/or data traffic routing apparatus. In a limit case applicable for some aspects of embodiments the predetermined threshold may be set to zero (X=0), that is, each time one or more instances of experience are stored the threshold may be exceeded. However, typically the second agent is configured to store a plurality of instances of experience information, so the predetermined threshold is set to a higher value (for example, X=99, such that the threshold is exceeded when $N_e$=100). As explained in greater detail below, setting the predetermined threshold value lower results in more frequent updates and therefore a more accurate and responsive system, but consequences of the more frequent updates may include delays in the provision of routing instructions and/or an increase in the volume of transmissions between the first and second agents. Typically, the predetermined threshold may be set such that the number of instances of stored experience is sufficient for batch training of the machine intelligence, so the predetermined threshold may be referred to as a batch size parameter. The determination of whether the number of instances of stored experience $N_e$ exceeds a predetermined threshold X may be performed by the processor 41 of the apparatus 40A shown in FIG. 4A, executing instructions stored in the memory 42, or may be performed by the determinator 51 of the second agent 48 of the apparatus 40B shown in FIG. 4B.

When the number of instances of stored experience information exceeds the threshold, the second agent may use the stored experience information to train the machine intelligence (as shown in S313). The exact training procedure to be followed is dependent on the specific configuration of the network and the data traffic routing apparatus; and example training procedure is as follows. The example below discusses the training of a system comprising a deep neural network; other machine intelligences may also be used as discussed above. The training may be performed by the processor 41 of the apparatus 40A shown in FIG. 4A, executing instructions stored in the memory 42, or may be performed by the trainer 52 of the second agent 48 of the apparatus 40B shown in FIG. 4B.

For each instance of experience information stored in the replay memory (experience storage), the second agent may pass the state of the communication network prior to implementation of the data traffic routing instructions $s_t$ to the neural network. The neural network processes $s_t$, and outputs a suggested action $a_{st}$, that is, suggested routing instructions. The suggested routing instructions may be in agreement with the routing instructions $a_t$ that were generated by the current routing model when that routing model was input the state $s_t$, or may be different routing instructions. The likelihood of the suggested routing instructions $a_{st}$ differing from the routing instructions $a_t$ is at least partially dependent upon the amount of divergence between the neural network and the current routing model, and may also be influenced by other factors such as stochastic elements in the generation of the routing instructions.

Once the suggested routing instructions $a_{st}$ have been output by the neural network, the second agent replaces the suggested routing instructions $a_{st}$ with the routing instructions that were generated by the current routing model when that routing model was input the state $s_t$. The second agent then passes the state of the communication network following the implementation of the data traffic routing instructions $s_{t+1}$ and the packet routing performance of the communication network following the implementation of the data traffic routing instructions $r_{t+1}$ as inputs to the neural network, and the process is repeated for each instance of experience information stored in the replay memory. Once experience information has been used for training, it may be deleted from the replay memory; when all of the $N_e$ instances of experience information have been used, the training instance may be complete.

By replaying the routing decisions made by the current routing model in this way, the neural network is able to learn from the accumulated experience of the current routing model, without delaying any pending routing decisions. The neural network modifies the weights w assigned to neurons forming the network (the weight of a neuron may increase or decrease the strength of a signal sent by the neuron), and biases b towards or away from certain connections; thereby altering the neural network based on learnt experience. Once the neural network has processed each instance of experience information stored in the replay memory as discussed above, the neural network may have been substantially modified based on the learnt experience.

The accumulated learning can be represented as new values for each of the y weights $w_y$ and biases $b_y$ of the network. The updated weights $w_y$ and biases $b_y$ may then be obtained by the second agent (see step S314) and sent by the second agent to the first agent (see step S315). The first agent may then update the routing model using the updated weights $w_y$ and biases $b_y$ (see step S305). Essentially, the current routing model is modified to bring it into conformity with the neural network. The updated routing model (that is, the new current routing model) may then be used by the first agent to provide data traffic routing instructions to the UPF in response to subsequent requests for routing instructions. The updated weights $w_y$ and biases $b_y$ may be calculated by the processor 41 of the apparatus 40A shown in FIG. 4A, executing instructions stored in the memory 42, or may be sent by the transmitter 53 of the second agent 48, received by the receiver 45 of the first agent 44 and used by the updater 54 to update the routing model of the apparatus 40B shown in FIG. 4B.

The static current routing model can provide rapid routing decisions, and is therefore able to satisfy the demanding latency and data rate requirements for routing in the context of a communication network (unlike a machine intelligence which may be too slow to provide live routing instructions). However, as traffic is routed through the communication network, and as connections within the communication network are established or broken, the static current routing model will gradually become a less accurate representation of the communication network, and the routing decisions will therefore gradually become suboptimal. By updating the routing model based on a machine intelligence that is taught by processing experience information (as discussed above), the routing model can continue to accurately represent the communication network and can therefore continue to provide accurate routing decisions for efficient routing of data traffic.

It will be understood that the detailed examples outlined above are merely examples. According to embodiments herein, the steps may be presented in a different order to that described herein. Furthermore, additional steps may be incorporated in the method that are not explicitly recited above. For the avoidance of doubt, the scope of protection is defined by the claims.

The following statements provide additional information:

Statement 1. A data traffic routing method for controlling data traffic in a communication network, the method comprising:
  receiving, at a first agent from a User Plane Function, communication network status information;
  calculating, by the first agent, data traffic routing instructions using a current routing model;
  sending by the first agent: the data traffic routing instructions to the User Plane Function; and experience information to a second agent;
  storing, at the second agent, the experience information;
  determining, at the second agent, if the number of instances of stored experience information exceeds a predetermined threshold; and
  if it is determined that the number of instances of stored experience information exceeds a predetermined threshold: training a neural network using the instances of stored experience information; and updating the current routing model using results of the neural network training.

Statement 2. The method of statement 1, wherein the communication network comprises a wireless network.

Statement 3. The method of statement 2, wherein the communication network comprises a consolidated network formed from a plurality of networks, the plurality of networks comprising the wireless network and a further network.

Statement 4. The method of statement 3, wherein the further network is a Wi-Fi network, a fixed access network or a further wireless network.

Statement 5. The method of any of statements 3 and 4, wherein the plurality of networks are used to form an aggregated network, or wherein the plurality of networks are divided into a primary network and one or more backup networks.

Statement 6. The method of any preceding statement, wherein the second agent sends the update information for updating the current routing model to the first agent.

Statement 7. The method of statement 6, wherein the first agent and the User Plane Function are located in a first network device, and wherein the second agent and the neural network are located in a second network device.

Statement 8. The method of statement 7, wherein the first network device is a base station, and the second network device is a core network node.

Statement 9. The method of any preceding statement, wherein the communication network status information is received at the first agent each time N data plane packets have been received at the User Plane Function, where N is a positive integer.

Statement 10. The method of statement 9, wherein N=1.

Statement 11. The method of any of statements 1 to 8, wherein the communication network status information is received at the first agent with a given periodicity.

Statement 12. The method of any preceding statement, wherein weights and biases of the current routing model are updated using the result of the neural network training.

Statement 13. The method of any preceding statement, wherein the neural network is a Deep Neural Network.

Statement 14. The method of any preceding statement, wherein the experience information comprises at least one of:
  the state of the communication network prior to implementation of the data traffic routing instructions;
  the data traffic routing instructions;
  the state of the communication network following the implementation of the data traffic routing instructions; and
  the packet routing performance of the communication network following the implementation of the data traffic routing instructions.

Statement 15. The method of any preceding statement, wherein the communication network status information comprises packet routing performance of the communication network following implementation of previous data traffic routing instructions.

Statement 16. The method of any preceding statement further comprising, by the User Plane Function, routing data traffic in the communication network in accordance with the data traffic routing instructions.

Statement 17. A data traffic routing control apparatus for controlling data traffic in a communication network, the apparatus comprising processing circuitry and a non-transitory machine-readable medium storing instructions, the apparatus being configured to:
  receive, using a first agent, from a User Plane Function, communication network status information;
  calculate, using the first agent, data traffic routing instructions using a current routing model;
  send, using the first agent, the data traffic routing instructions to the User Plane Function; and
  send, using the first agent, experience information;
  receive and store, using a second agent, the experience information; and
  determine, using the second agent, if the number of instances of stored experience information exceeds a predetermined threshold;
wherein, if the second agent determines that the number of instances of stored experience information exceeds a predetermined threshold, the apparatus is further configured to:
  train a neural network using the instances of stored experience information; and
  send update information, using the second agent to the first agent, for updating the current routing model using results of the neural network training.

Statement 18. The apparatus of statement 17, wherein the communication network comprises a wireless network.

Statement 19. The apparatus of statement 18, wherein the communication network comprises a consolidated network formed from a plurality of networks, the plurality of networks comprising the wireless network and a further network.

Statement 20. The apparatus of statement 19, wherein the further network is a Wi-Fi network or fixed access network.

Statement 21. The apparatus of any of statements 19 and 20, wherein the plurality of networks are used to form an aggregated network, or wherein the plurality of networks are divided into a primary network and one or more backup networks.

Statement 22. The apparatus of any of statements 17 to 21, wherein the apparatus is further configured to send, using the second agent to the first agent, update information for updating the current routing model.

Statement 23. The apparatus of statement 22, further comprising a first network device and a second network device, wherein the first agent and the User Plane Function are located in the first network device, and wherein the second agent and the neural network are located in the second network device.

Statement 24. The apparatus of statement 23, wherein the first network device is a base station, and the second network device is a core network node.

Statement 25. The apparatus of any of statements 17 to 24, wherein the first agent is configured to receive the communication network status information each time N data plane packets have been received at the User Plane Function, where N is a positive integer.

Statement 26. The apparatus of statement 25, wherein N=1.

Statement 27. The apparatus of any of statements 17 to 24, wherein the apparatus is configured to, using the first agent, receive the communication network status information at a given periodicity.

Statement 28. The apparatus of any of statements 17 to 27, wherein the apparatus is configured to, using the first agent, update the weights and biases of the current routing model using the results of the neural network training.

Statement 29. The apparatus of any of statements 17 to 28, wherein the neural network is a Deep Neural Network.

Statement 30. The apparatus of any of statements 17 to 29, wherein the experience information comprises at least one of:

the state of the communication network prior to implementation of the data traffic routing instructions;

the data traffic routing instructions;

the state of the communication network following the implementation of the data traffic routing instructions; and the packet routing performance of the communication network following the implementation of the data traffic routing instructions.

Statement 31. The apparatus of any of statements 17 to 30, wherein communication network status information comprises packet routing performance of the communication network following implementation of previous data traffic routing instructions.

Statement 32. The apparatus of any of statements 17 to 31, further comprising the User Plane Function, wherein the User Plane Function is configured to route data traffic in the communication network in accordance with the data traffic routing instructions.

Statement 33. A data traffic routing control apparatus for controlling data traffic in a communication network, the apparatus comprising a first agent and a second agent, wherein the first agent comprises:

a receiver configured to receive from a User Plane Function, communication network status information;

a calculator configured to calculate data traffic routing instructions using a current routing model;

a transmitter configured to send the data traffic routing instructions to the User Plane Function; and send experience information to the second agent; and wherein the second agent comprises:

a receiver configured to receive experience information;

a memory configured to and store the experience information; and a determinator determine if the number of instances of stored experience information exceeds a predetermined threshold;

wherein, if the second agent determines that the number of instances of stored experience information exceeds a predetermined threshold, the second agent is further configured to:

train, using a trainer, a neural network using the instances of stored experience information; and send, using a transmitter, update information to the first agent, wherein the first agent is further configured to, using an updater, update the current routing model using results of the neural network training.

Statement 34. A computer-readable medium comprising instructions which, when executed on a computer, cause the computer to perform a method in accordance with any of statements 1 to 16.

The invention claimed is:

1. A data traffic routing method for controlling data traffic in a communication network, the method comprising:

receiving, by a first agent from a User Plane Function (UPF), communication network status information;

calculating, by the first agent, data traffic routing instructions using a current routing model;

sending, by the first agent, the data traffic routing instructions to the UPF and experience information to a second agent;

storing, by the second agent, the experience information received from the first agent;

determining, by the second agent, whether a number of instances of stored experience information exceeds a predetermined threshold; and when it is determined that the number of instances of stored experience information exceeds the predetermined threshold, training a neural network by the second agent using the instances of stored experience information and updating the current routing model by the first agent using update information determined by the neural network training.

2. The method of claim 1, wherein:

the communication network comprises a consolidated network formed from a plurality of networks;

the plurality of networks comprises a wireless network and a further network; and the further network is a Wi-Fi network, a fixed access network, or a further wireless network.

3. The method of claim 2, wherein one of the following applies:

the plurality of networks form an aggregated network; or the plurality of networks are divided into a primary network and one or more backup networks.

4. The method of claim 1, further comprising the second agent sending the first agent the update information for updating the current routing model.

5. The method of claim 4, wherein:

the first agent and the UPF are located in a base station of a wireless network comprising the communication network, and the second agent and the neural network are located in a node of a core network comprising the communication network.

6. The method of claim 1, wherein the communication network status information is received by the first agent from the UPF each time N data plane packets have been received by the UPF, where N is a positive integer.

7. The method of claim 1, wherein one or more of the following applies:
   the communication network status information is received at the first agent with a given periodicity; and
   the neural network is a Deep Neural Network.

8. The method of claim 1, wherein the update information comprises updated weights and biases with respect to the current routing model.

9. The method of claim 1, wherein one or more of the following applies:
   the experience information comprises at least one of the following:
      the state of the communication network prior to implementation of the data traffic routing instructions,
      the data traffic routing instructions,
      the state of the communication network following the implementation of the data traffic routing instructions, and
      the packet routing performance of the communication network following the implementation of the data traffic routing instructions; and
   the communication network status information comprises packet routing performance of the communication network following implementation of previous data traffic routing instructions.

10. The method of claim 1 further comprising routing, by the UPF, data traffic in the communication network in accordance with the data traffic routing instructions.

11. A data traffic routing control apparatus configured to control data traffic in a communication network, the apparatus comprising:
   processing circuitry; and
   a non-transitory, machine-readable medium storing instructions, wherein execution of the instructions by the processing circuitry configures the apparatus to:
   receive, by a first agent from a User Plane Function (UPF), communication network status information;
   calculate, by the first agent, data traffic routing instructions using a current routing model;
   send, by the first agent, the data traffic routing instructions to the UPF and experience information to a second agent;
   store, at the second agent, the experience information received from the first agent;
   determine, by the second agent, whether a number of instances of stored experience information exceeds a predetermined threshold;
   when it is determined that the number of instances of stored experience information exceeds the predetermined threshold, train a neural network by the second agent using the instances of stored experience information and update the current routing model by the first agent using update information determined by the neural network training.

12. The apparatus of claim 11, wherein:
   the communication network comprises a consolidated network formed from a plurality of networks;
   the plurality of networks comprises a wireless network and a further network; and
   the further network is a Wi-Fi network, a fixed access network, or a further wireless network.

13. The apparatus of claim 12, wherein one of the following applies:
   the plurality of networks form an aggregated network; or
   the plurality of networks are divided into a primary network and one or more backup networks.

14. The apparatus of claim 11, wherein execution of the instructions further configures the apparatus to send, by the second agent to the first agent, the update information for updating the current routing model.

15. The apparatus of claim 14, wherein:
   the first agent and the UPF are located in a base station of a wireless network comprising the communication network, and
   the second agent and the neural network are located in a node of a core network comprising the communication network.

16. The apparatus of claim 11, wherein the communication network status information is received by the first agent from the UPF each time N data plane packets have been received by the UPF, where N is a positive integer.

17. The apparatus of claim 11, wherein one or more of the following applies:
   the communication network status information is received at the first agent with a given periodicity; and
   the neural network is a Deep Neural Network.

18. The apparatus of claim 11, wherein the update information comprises updated weights and biases with respect to the current routing model.

19. The apparatus of claim 11, wherein one or more of the following applies:
   the experience information comprises at least one of the following:
      the state of the communication network prior to implementation of the data traffic routing instructions,
      the data traffic routing instructions,
      the state of the communication network following the implementation of the data traffic routing instructions, and
      the packet routing performance of the communication network following the implementation of the data traffic routing instructions; and
   the communication network status information comprises packet routing performance of the communication network following implementation of previous data traffic routing instructions.

20. The apparatus of claim 11, wherein execution of the instructions further configures the apparatus to route, by the UPF, data traffic in the communication network in accordance with the data traffic routing instructions.

21. A non-transitory, computer-readable medium storing instructions that, when executed by processing circuitry associated with a data traffic routing control apparatus configured to control data traffic in a communication network, cause the data traffic control apparatus to perform operations corresponding to the method of claim 1.

* * * * *